United States Patent
Yan et al.

(10) Patent No.: US 10,297,882 B2
(45) Date of Patent: May 21, 2019

(54) BATTERY SYSTEM WITH A TEMPERATURE-CONTROL ELEMENT CONTAINING A TEMPERATURE-CONTROL CHANNEL AND A BYPASS AND MOTOR VEHICLE CONTAINING THE BATTERY SYSTEM

(71) Applicants: Xiaofeng Yan, Weinstadt (DE); Christian Pankiewitz, Stuttgart (DE); Sylvain Guenon, Ressons sur Matz (FR); Christian Loew, Stuttgart (DE); Achim Schmidt, Hamburg (DE)

(72) Inventors: Xiaofeng Yan, Weinstadt (DE); Christian Pankiewitz, Stuttgart (DE); Sylvain Guenon, Ressons sur Matz (FR); Christian Loew, Stuttgart (DE); Achim Schmidt, Hamburg (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 324 days.

(21) Appl. No.: 13/261,879

(22) PCT Filed: Sep. 17, 2012

(86) PCT No.: PCT/EP2012/068182
§ 371 (c)(1),
(2) Date: May 14, 2014

(87) PCT Pub. No.: WO2013/072093
PCT Pub. Date: May 23, 2013

(65) Prior Publication Data
US 2014/0295228 A1     Oct. 2, 2014

(30) Foreign Application Priority Data
Nov. 14, 2011   (DE) .................. 10 2011 086 246

(51) Int. Cl.
*H01M 2/10* (2006.01)
*H01M 10/617* (2014.01)
(Continued)

(52) U.S. Cl.
CPC ..... *H01M 10/6556* (2015.04); *H01M 2/1077* (2013.01); *H01M 10/617* (2015.04);
(Continued)

(58) Field of Classification Search
CPC .................... H01M 10/6556; H01M 10/6557
See application file for complete search history.

(56) References Cited

U.S. PATENT DOCUMENTS

| | | | |
|---|---|---|---|
| 2008/0164081 A1* | 7/2008 | Watanabe | B60H 1/00278 180/68.5 |
| 2009/0263708 A1* | 10/2009 | Bender | H01M 2/105 429/120 |
| 2011/0212355 A1 | 9/2011 | Essinger et al. | |

FOREIGN PATENT DOCUMENTS

| | | |
|---|---|---|
| CN | 102170034 A | 8/2011 |
| DE | 10 2006 061 270 A1 | 6/2008 |

(Continued)

OTHER PUBLICATIONS

Machine translation of WO 2011060980 A1, provided by EPO, dated May 26, 2011, retrieved Mar. 1, 2017.*

(Continued)

*Primary Examiner* — Robert S Carrico
(74) *Attorney, Agent, or Firm* — Maginot, Moore & Beck LLP

(57) ABSTRACT

A battery system includes a plurality of battery cells and a temperature-control element that is thermally conductively connected to the battery cells via a temperature-control surface. The temperature-control element has a temperature-control channel in an interior of the temperature-control (Continued)

element. The temperature-control channel is routed on the forward flow side via an inlet and on the return flow side via an outlet from the temperature-control element. A bypass is connected to the temperature-control channel via a dividing node and a merging node with the dividing node being arranged closer to the inlet than the merging node. A motor vehicle includes the battery system.

8 Claims, 3 Drawing Sheets

(51) Int. Cl.
*H01M 10/625* (2014.01)
*H01M 10/656* (2014.01)
*H01M 10/6556* (2014.01)
*H01M 10/6567* (2014.01)
*H01M 10/647* (2014.01)

(52) U.S. Cl.
CPC ....... *H01M 10/625* (2015.04); *H01M 10/656* (2015.04); *H01M 10/6567* (2015.04); *H01M 10/647* (2015.04)

(56) References Cited

FOREIGN PATENT DOCUMENTS

| DE | 10 2009 046 801 A1 | 5/2011 | |
|---|---|---|---|
| JP | 2011181224 A * | 9/2011 | |
| WO | 2010/094787 | 8/2010 | |
| WO | WO 2011060980 A1 * | 5/2011 | ............ H01M 2/021 |

OTHER PUBLICATIONS

International Search Report corresponding to PCT Application No. PCT/EP2012/068182, dated Jan. 4, 2013 (German and English language document) (5 pages).

* cited by examiner

BATTERY SYSTEM WITH A TEMPERATURE-CONTROL ELEMENT CONTAINING A TEMPERATURE-CONTROL CHANNEL AND A BYPASS AND MOTOR VEHICLE CONTAINING THE BATTERY SYSTEM

This application is a 35 U.S.C. § 371 National Stage Application of PCT/EP2012/068182, filed on Sep. 17, 2012, which claims the benefit of priority to Serial No. DE 10 2011 086 246.3, filed on Nov. 14, 2011 in Germany, the disclosures of which are incorporated herein by reference in their entirety.

BACKGROUND

The present disclosure relates to a battery system, which comprises a plurality of battery cells and a temperature control element, which has a thermally conductive connection to the battery cells via a temperature control surface. In its interior the temperature control element has a temperature control channel, which is routed via an inlet on the supply-flow side and via an outlet from the temperature control element on the return-flow side.

The disclosure further relates to a motor vehicle comprising the battery system.

It is becoming apparent that in future new battery systems, on which very high demands are placed with regard to reliability, safety, performance and service life, will be increasingly used both in stationary applications, such as wind power stations, in hybrid and electric motor vehicles, and in electronic appliances, such as laptops and mobile phones.

In order to ensure the safety and functioning of lithium-ion batteries, it is necessary to operate the lithium-ion cells within a predefined temperature range. During operation the lithium-ion cells generate heat, firstly in the form of the Joule effect, which can be described by the electric current and the internal resistance of a lithium-ion cell, and also by virtue of the heat produced due to reversible phenomena in the lithium-ion cell. This heat must be dissipated, in order to prevent heating of the lithium-ion cell beyond a critical operating temperature—and hence overheating of the lithium-ion cell.

In order to operate a lithium-ion battery in favorable temperature ranges, the lithium-ion cells are connected to a temperature control system. According to the type of temperature control fluid used, this system can in principle be divided into:
1. air cooling,
2. coolant cooling and
3. refrigerant cooling.

The choice of temperature control fluid is determined according to the level of temperature control performance required.

As a rule multiple cells are combined to form a module and multiple modules are in turn combined to form a battery. In the case of temperature control using a temperature control plate one or more battery modules are simultaneously temperature-controlled by a temperature control plate through thermal conduction. Aluminum is commonly used as material for a temperature control plate, or another material having at least equivalent heat-conducting characteristics is used.

The temperature control plate heats up the lithium-ion cells, for example when starting on cold days, or cools them, for example during high-load operation at high ambient temperatures. In many technical applications the lithium-ion cells are temperature-controlled via their underside. Due to the overall space available it is often necessary to distribute the battery cells over multiple temperature control plates within a battery. For optimum battery operation these temperature control plates have to be hydraulically adjusted according to their thermal loads. Here distributor blocks serve to distribute the mean temperature control mass flow and to deliver it to the individual temperature control plates via flexible hose lines. The return flow is correspondingly fed in the reverse direction from each temperature control plate to a central collector by means of flexible hoses and led out of the battery housing. For designing such a temperature control system load cycles are generally used, by means of which it is possible to predict the temperature rise within the lithium-ion battery under known thermal boundary conditions.

When cooling multiple battery cells using one temperature control plate with temperature control fluid flowing through it, the temperature of the temperature control fluid steadily increases due to the absorbed heat losses from the battery cells as the flow passes through the temperature control plate. As a result, those battery cells which the temperature control fluid reaches only later are cooled with a warmer temperature control fluid than those batteries which have already been cooled by the temperature control fluid previously. Given an approximately equal power loss from the battery cells, this inevitably results in a higher temperature for the battery cells cooled by the already heated temperature control fluid, than for those that have been cooled by the still cooler temperature control fluid. For optimum battery performance and service life it is however necessary to regulate the temperature of all its battery cells to an approximately equal (optimum) temperature.

The publication DE 10 2006 061 270 A1 discloses a battery, a battery module and a method for operating a battery module. Here the evening-out of the temperature to an extent favorable to the operation of the battery cells is brought about by introducing, between the battery cells, a thermally conductive battery bed consisting of a metal body or a highly thermally conductive plastic mass, which may also additionally contain metal particles. A desired temperature balance between the battery cells can thereby be produced; the temperature can also be maintained at a required level for longer and if necessary can also be emitted more rapidly. Balancing and charging electronics exert additional influence on the maintenance of an optimum temperature during the discharging and charging cycles of the battery cells.

SUMMARY

According to the disclosure a battery system is provided. This comprises multiple battery cells and at least one temperature control element, which has a thermally conductive connection to the battery cells via its temperature control surface. In its interior the temperature control element has a temperature control channel, which is routed by means of an inlet on the supply-flow side and an outlet from the temperature control element on the return-flow side. It is wherein a bypass connected to the temperature control channel via a dividing node and a uniting node. The dividing node is arranged closer to the inlet than the uniting node. The temperature control channel is designed to receive a temperature control fluid, which in the direction of flow branches off at the dividing node and is led into the bypass, which constitutes a channel routed separately from the temperature control channel. The temperature control fluid is then fed in a parallel flow to the temperature control channel, until the bypass flow is fed back into the temperature control channel at the uniting node. The supply-flow side denotes that end of the temperature control channel through which the freshly conditioned temperature control fluid can enter, whereas the return-flow side denotes the other end of the temperature control channel. Water, mixed with antifreeze, for example, may be used as temperature control fluid. A mixture of water and glycol is particularly suitable for this purpose.

The battery system according to the disclosure has the advantage that multiple battery cells arranged on one single cooling plate can be regulated to an approximately equal temperature. This also applies to those battery cells which, owing to the flow ducting in the temperature control element, are reached by the temperature control fluid only at a later point in time. Consequently the battery has an increased service life and performance.

The bypass is preferably thermally insulated from the temperature control element. Thermal insulation or even isolation can preferably be achieved by producing the bypass channel from a heat-insulating material, for example plastic. A further preferred possibility is to separate the bypass channel from the rest of the temperature control element and in particular from the temperature control channel by a heat-insulating intermediate layer. Thermally insulating the bypass from the temperature control element means that the temperature control fluid is heated as little as possible in the bypass.

The bypass and the temperature control channel are furthermore preferably situated in the same plane, parallel to the temperature control surface. It is assumed here that a temperature control channel and bypass run parallel to the temperature control surface. If the maximum extent of the temperature control channel in a direction perpendicular to the temperature control surface is greater than that of the bypass, the entire bypass lies between two planes which are parallel to the temperature control surface and which touch the temperature control channel on both of its opposing sides. If the maximum extent of the bypass in a direction perpendicular to the temperature control surface is greater than that of the temperature control channel, the entire temperature control channel lies between two planes which are parallel to the temperature control surface and which touch the bypass on both of its opposing sides. If the temperature control channel and the bypass are situated in one plane, an especially space-saving, flat temperature control element can be achieved. Furthermore, it is thereby possible to create symmetrical cooling conditions for the temperature control surface and the lateral faces situated opposite the temperature control surface.

In addition, the perpendicular distances of all constituent areas of the bypass from the temperature control surface are preferably greater than the perpendicular distance of any constituent area of the temperature control channel. That constituent area of the bypass having the smallest perpendicular distance from the temperature control surface therefore has a greater perpendicular distance than that part of the temperature control channel having the greatest perpendicular distance from the temperature control surface. This consideration does not extend to possible overflow channels arranged between the bypass and the temperature control channel, which may be regarded as the dividing and uniting nodes.

The center line of the bypass projected perpendicularly onto the temperature control surface is furthermore preferably part of the center line of the temperature control channel projected perpendicularly on the temperature control surface. This development allows every temperature control channel to be supplied with conditioned fluid from its own bypass, which is arranged on the side of the temperature control channel remote from the temperature control surface.

In a preferred development of the disclosure the inlet and the outlet are arranged on opposite lateral faces of the temperature control element. This embodiment allows the temperature control channel to assume an I-shape, for example. Since the inlet and the outlet are situated on opposite sides of the temperature control channel, multiple temperature control elements can be arranged together in an especially compact arrangement parallel and in the same direction, so that all inlets are situated on the one side and all outlets on the other side of the temperature control elements arranged in parallel. This allows a supply feed of conditioned temperature control fluid and a discharge of heated or cooled temperature control fluid to be spatially separated from one another.

According to a further preferred development of the disclosure the inlet and the outlet are arranged on the same lateral face of the temperature control element. This embodiment allows the temperature control channel to assume a U-shape, for example. Since the inlet and the outlet are situated on the same side of the temperature control channel, like the I-shape multiple temperature control elements can again be arranged together in an especially compact arrangement parallel and in the same direction, all inlets and all outlets, however, now being situated on the same side of the temperature control elements arranged in parallel. This allows both the feed lines to the inlets and the discharge lines from the outlets to be compactly arranged on the same side of the temperature control elements arranged in parallel.

The battery cells are preferably lithium-ion secondary cells. Through the use of lithium-ion technology it is possible to achieve especially high power and energy storage densities, affording further advantages particularly in the field of electric traction.

The temperature control element is preferably composed largely of aluminum or copper, allowing a high thermal conductance.

A motor vehicle having a battery system according to the disclosure is furthermore provided, wherein the battery system is generally intended for feeding an electrical drive system of the vehicle.

Advantageous developments of the disclosure are specified in the dependent claims or set forth in the description.

BRIEF DESCRIPTION OF THE DRAWINGS

Exemplary embodiments of the disclosure are explained in more detail with reference to the drawings and in the following description. In the drawings.

DETAILED DESCRIPTION

Figure 1:
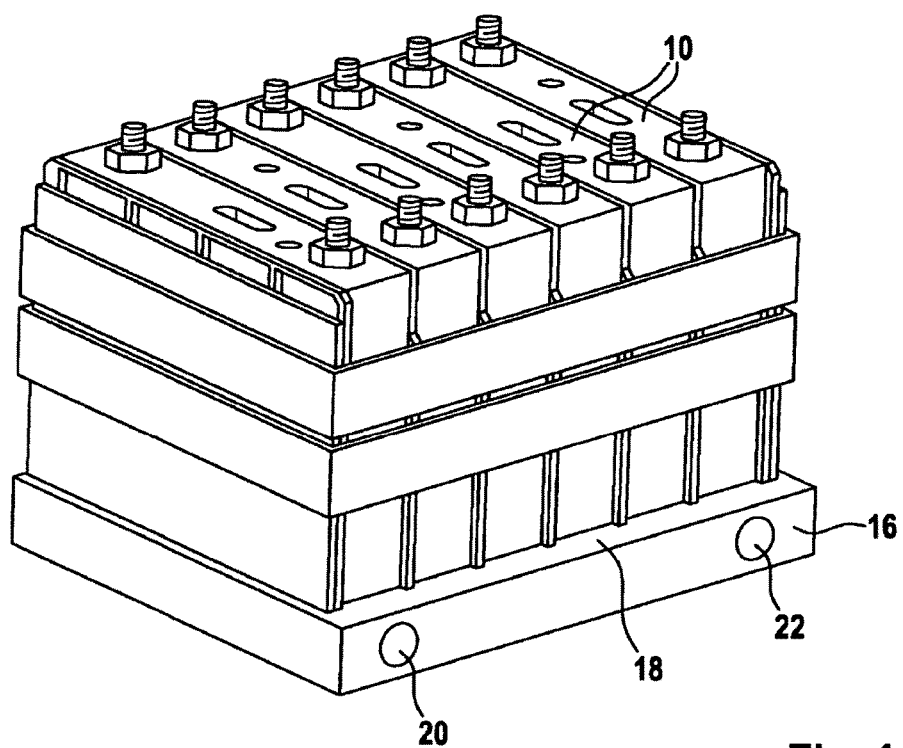
FIG. 1 shows a battery system according to the disclosure.

FIG. 1 shows a battery system according to the disclosure. A plurality of battery cells 10 is arranged on a temperature control element 16. The temperature control element 16 comprises an inlet 20 and an outlet 22, through which in operation a temperature control fluid, for example a temperature control liquid, can enter and leave. On the way from the inlet 20 to the outlet 22 the temperature control fluid flows through a temperature control channel 24 arranged inside the temperature control element 16 and thus allows heat to be transmitted between cells 10 and the temperature control fluid, the heat being transmitted by thermal conduction via the temperature control surface 18.

Figure 2:
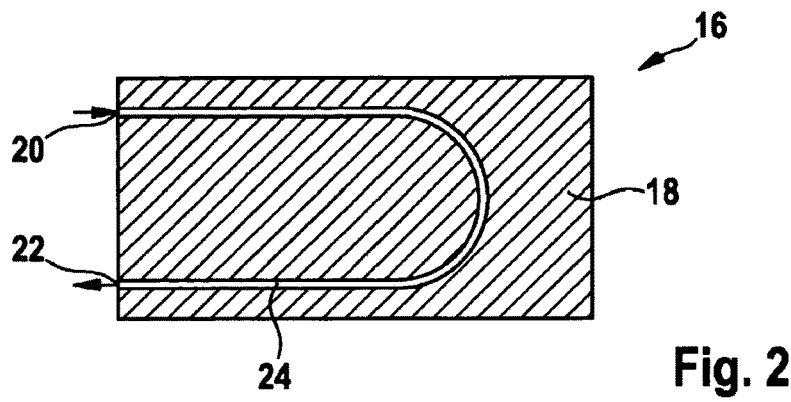
FIGS. 2 to 4 show a temperature control element with U-shaped temperature control channel.
Figure 3:
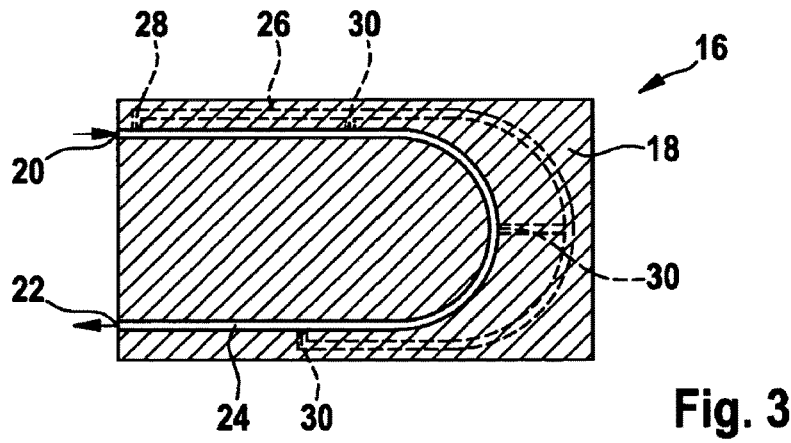
Figure 4:
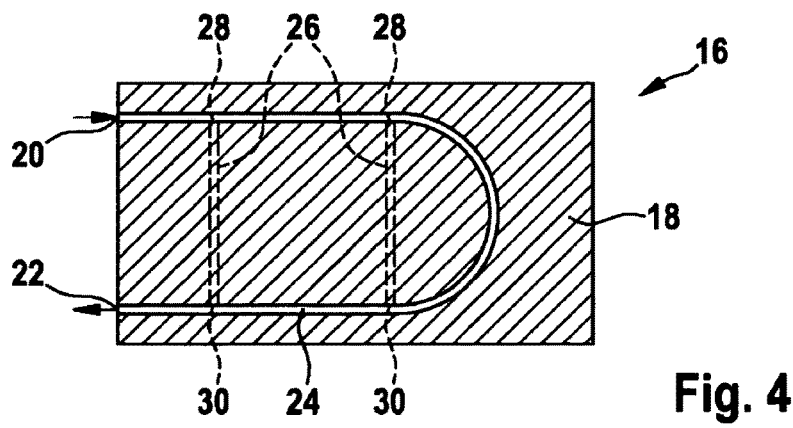

FIGS. 2, 3 and 4 show a schematic sectional representation of the internal flow ducting of various temperature control elements 16, the plane of section running through the temperature control channel 24 offset parallel to the temperature control surface 18. The temperature control channel 24 is of U-shaped design; the inlet 20 and the outlet 22 are accordingly situated on the same lateral face of the temperature control element 16.

FIG. 2 schematically shows a temperature control element 16 according to the state of the art. During operation the temperature control fluid flows through the temperature control channel 24 from the inlet 20 to the outlet 22 and is heated when the battery cells 10 are being cooled, or cooled when the battery cells 10 are being heated.

The temperature control element 16 according to the disclosure, shown and represented schematically in FIG. 3, comprises a bypass 26, schematically drawn in with dashed lines, which is arranged outside the temperature control channel 24. The bypass 26 is flow-connected to the temperature control channel 24 by means of a dividing node 28 and three uniting nodes 30.

The two bypasses 26, schematically represented by dashed lines in FIG. 4, are each flow-connected to the temperature control channel 24 by means of a dividing node 28 and a uniting node 30, the bypasses 26 being suitably arranged on the inside of the U-shaped temperature control channel 24.

Figure 5:
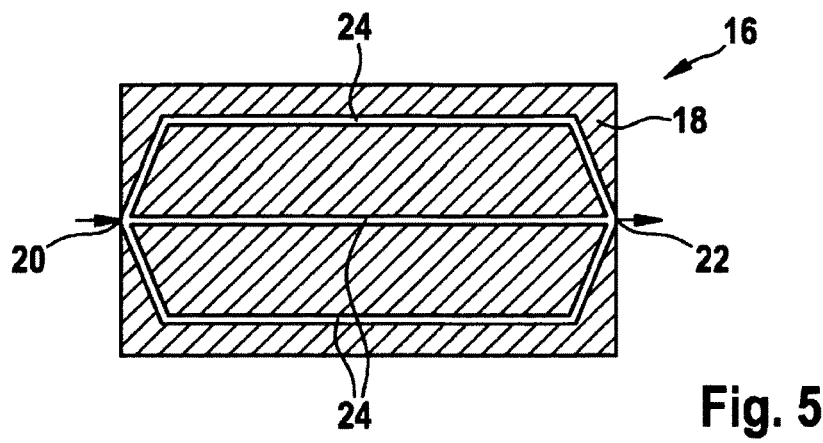
FIGS. 5 and 6 show a temperature control element having multiple temperature control channels in an I-shape.
Figure 6:
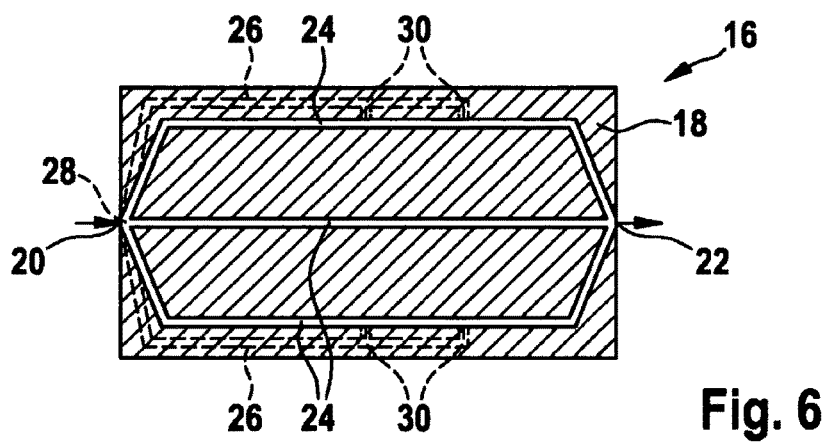

FIGS. 5 and 6 show a schematic sectional representation of the internal flow ducting of various temperature control elements 16, the plane of section running through the temperature control channel 24 offset parallel to the temperature control surface. As depicted, the temperature control channels 24 are of I-shaped design; the inlet 20 and the outlet 22 are accordingly situated on opposite lateral faces of the temperature control element 16.

FIG. 5 schematically shows a temperature control element 16 according to the state of the art. During operation the temperature control fluid flows through the temperature control channel 24 from the inlet 20 to the outlet 22, the temperature control fluid being divided up downstream of the inlet 20, fed in parallel into the temperature control channels 24 and reunited upstream of the outlet 22. It heats up when the battery cells 10 are being cooled, or cools when the battery cells 10 are being heated.

The temperature control element 16 according to the disclosure, shown and represented schematically in FIG. 6, comprises two bypasses 26 of symmetrical design, schematically represented by dashed lines, which are arranged outside the outer two temperature control channels 24. The bypasses 26 are each flow-connected to the associated outer temperature control channels 24 by means of a dividing node 28 and two uniting nodes 30.

In principle the bypasses 26 shown schematically in FIGS. 3, 4 and 6 may be situated in the same plane parallel to the temperature control surface 18 and the temperature control channels 24. On the one hand this affords the flattest possible temperature control element 16 but it may possibly necessitate thermal insulation of the bypasses 26. Moreover with some arrangements of the temperature control channels 24 it is difficult to provide bypasses 26 for all temperature control channels 24—see FIG. 3b. Particularly with temperature control channels 24 arranged tightly side by side it is not readily possible to arrange bypasses 26 between the temperature control channels 24.

Figure 7:
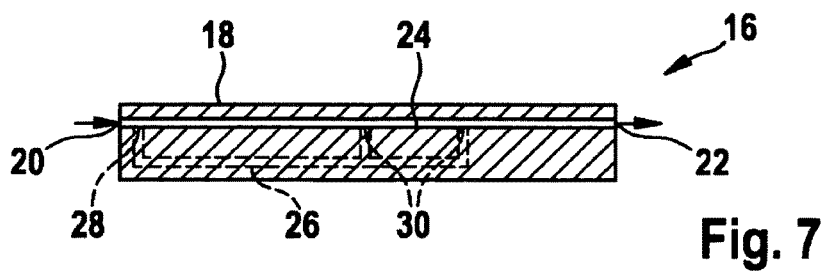
FIG. 7 shows a temperature control element having a bypass arranged more deeply.

FIG. 7, which shows a schematic sectional representation with a plane of section through a temperature control channel 24 perpendicular to the temperature control surface 18, indicates a possible remedy. It will be seen that the perpendicular distances of all constituent areas of the bypass 26, drawn in schematically by dashed lines, from the temperature control surface are greater than the perpendicular distance of any constituent area of the temperature control channel. The bypass 26 therefore runs in a plane which is arranged further offset from the temperature control surface than that plane in which the temperature control channel 24 runs. Overflow channels (shown vertically in the drawing), which are arranged between the bypass 26 and the temperature control channel 24 and which can be regarded as the nodes 28 and 30, are not considered to be part of the bypass 26. This development makes it possible to arrange the bypass 26 congruently with the temperature control channel 24 in the perpendicular projection onto the temperature control surface 18. Even in complicated arrangements, all temperature control channels 24 can thereby be supplied with fresh temperature control fluid from the bypasses 26. Furthermore, the increased offset of the bypasses 26 relative to the temperature control surface 18 makes any thermal insulation easier or superfluous.

In order to ensure functioning of the bypasses 26 shown in FIGS. 3, 4, 6 and 7, the bypasses 26 and the dividing and the uniting nodes 28, 30 together with overflow channels must be matched to the temperature control channels 24. This can be done, for example via the cross sectional areas of the bypasses 26 or via suitable restrictors in the dividing and uniting nodes 28, 30. During operation temperature control fluid from the temperature control channels 24 is diverted into the dividing nodes 28. This fluid flows through the respective bypass 26 parallel to the respective temperature control channels. Whilst the temperature control fluid, in the course of the temperature control channel 24, is increasingly heated or cooled by the battery cells 10 to be cooled or heated, the temperature of the temperature control fluid flowing in the bypass 26 remains largely constant. This is brought about, for example, by the thermal insulation already mentioned or an appropriate geometric arrangement with a large distance from the temperature control surface 18. Nodes 30 uniting in the direction of flow, at which at least some of the temperature control fluid is returned from the bypass 26 in to temperature control channel 24, are situated at suitable points, which can be arithmetically determined, for example. Downstream of the uniting nodes 30 the temperature control fluid has a temperature which lies between the temperature of the temperature control fluid in the bypass 26 and the temperature of the temperature control fluid in the temperature control channel 24. Consequently the temperature of the temperature control fluid downstream of the uniting nodes 30 corresponds more to the temperature of the temperature control fluid at the dividing nodes 28 than that in the temperature control channel 24 upstream of the uniting nodes 30. As a result the battery cells 10 are more uniformly regulated to a specific temperature than would be the case without bypasses 26 according to FIGS. 2 and 5.

The invention claimed is:

1. A battery system comprising:
a plurality of battery cells;
at least one temperature control element having a thermally conductive connection to the battery cells via a temperature control surface, the at least one temperature control element in its interior further having a temperature control channel that is routed via an inlet on a supply-flow side and via an outlet from the at least one temperature control element on a return-flow side; and
a bypass directly connected to the temperature control channel via both a dividing node and a uniting node, the dividing node separate from the inlet and the uniting node separate from the outlet, the dividing node arranged closer to the inlet than the uniting node;
wherein a heat-insulating intermediate layer separates the bypass from the temperature control channel; and
wherein the perpendicular distances of all constituent areas of the bypass from the temperature control surface are greater than the perpendicular distance of any constituent area of the temperature control channel.

2. The battery system as claimed in claim 1, wherein the bypass is then ally insulated from the at least one temperature control element or heat insulated.

3. The battery system as claimed in claim 1, wherein the center line of the bypass projected perpendicularly onto the temperature control surface is part of the center line of the temperature control channel projected perpendicularly on the temperature control surface.

4. The battery system as claimed in claim 1, wherein the inlet and the outlet are arranged on opposite lateral faces of the at least one temperature control element.

5. The battery system as claimed in claim 1, wherein the inlet and the outlet are arranged on the same lateral face of the at least one temperature control element.

6. The battery system as claimed in claim 1, wherein the battery cells are lithium-ion secondary cells.

7. A motor vehicle comprising:
a battery system including:
a plurality of battery cells;
at least one temperature control element having a thermally conductive connection to the battery cells via a temperature control surface, the at least one temperature control element in its interior further having a temperature control channel that is routed via an inlet on a supply-flow side and via an outlet from the at least one temperature control element on a return-flow side; and
a bypass directly connected to the temperature control channel via both a dividing node and a uniting node, the dividing node separate from the inlet and the uniting node separate from the outlet, the dividing node arranged closer to the inlet than the uniting node;
wherein a heat-insulating intermediate layer separates the bypass from the temperature control channel; and
wherein the perpendicular distances of all constituent areas of the bypass from the temperature control surface are greater than the perpendicular distance of any constituent area of the temperature control channel.

8. A battery system comprising:
a plurality of battery cells;
at least one temperature control element having a thermally conductive connection to the battery cells via a temperature control surface, the at least one temperature control element in its interior further having a temperature control channel that is routed via an inlet on the supply-flow side and via an outlet from the at least one temperature control element on the return-flow side; and
a bypass is directly connected to the temperature control channel via both a dividing node and a uniting node, the dividing node separate from the inlet and the uniting node separate from the outlet, the dividing node arranged closer to the inlet than the uniting node;
wherein the perpendicular distances of all constituent areas of the bypass from the temperature control surface are greater than the perpendicular distance of any constituent area of the temperature control channel.

* * * * *

UNITED STATES PATENT AND TRADEMARK OFFICE
CERTIFICATE OF CORRECTION

PATENT NO. : 10,297,882 B2
APPLICATION NO. : 13/261879
DATED : May 21, 2019
INVENTOR(S) : Yan et al.

Page 1 of 1

It is certified that error appears in the above-identified patent and that said Letters Patent is hereby corrected as shown below:

In the Claims

In Column 7, Lines 23-25, Lines 1-3 of Claim 2 should read:
2. The battery system as claimed in claim 1, wherein the bypass is thermally insulated from the at least one temperature control element or heat insulated.

Signed and Sealed this
Fifth Day of November, 2019

Andrei Iancu
*Director of the United States Patent and Trademark Office*